No. 760,406. PATENTED MAY 17, 1904.
J. A. GREGERSEN.
WIRE STRAIGHTENER.
APPLICATION FILED FEB. 21, 1903.
NO MODEL. 3 SHEETS—SHEET 1.
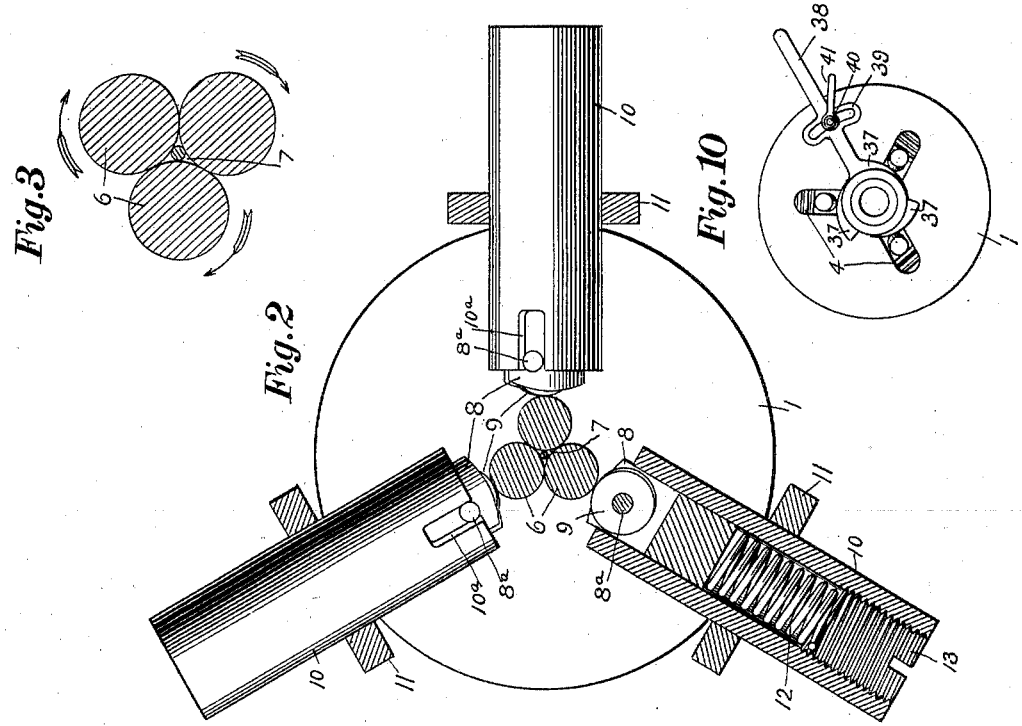
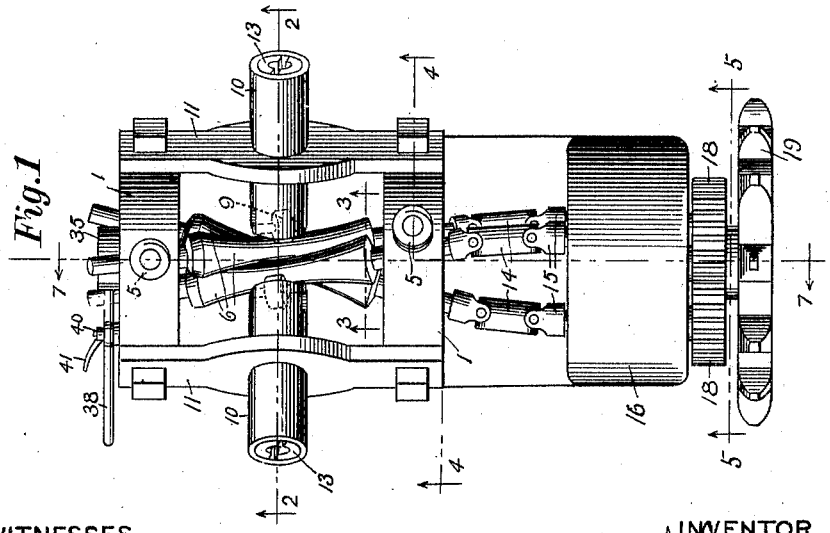
WITNESSES
M. Gertrude Ady.
Fred'k G. Fischer
INVENTOR
John A. Gregerson
BY Burton and Burton
ATTORNEY No. 760,406. PATENTED MAY 17, 1904.
J. A. GREGERSEN.
WIRE STRAIGHTENER.
APPLICATION FILED FEB. 21, 1903.
NO MODEL. 3 SHEETS—SHEET 2.
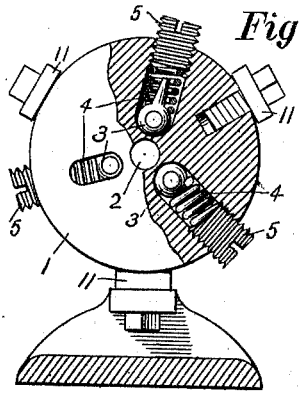
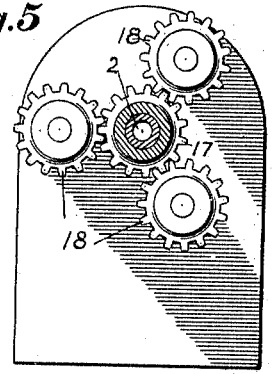
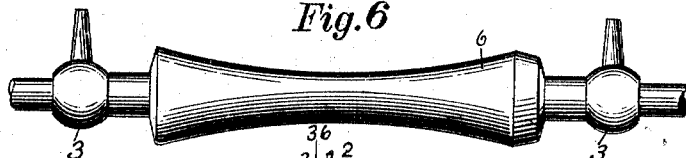
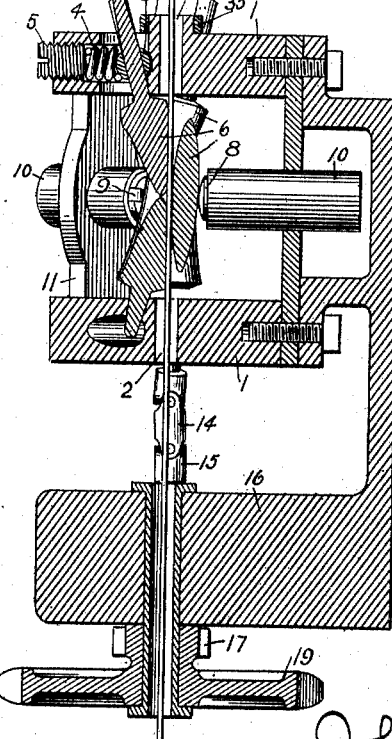
WITNESSES: INVENTOR
M. Gertrude Ady. John A. Gregersen
Fred G. Fischer BY
Burton & Burton
ATTORNEYS No. 760,406. PATENTED MAY 17, 1904.
J. A. GREGERSEN.
WIRE STRAIGHTENER.
APPLICATION FILED FEB. 21, 1903.
NO MODEL.
3 SHEETS—SHEET 3.
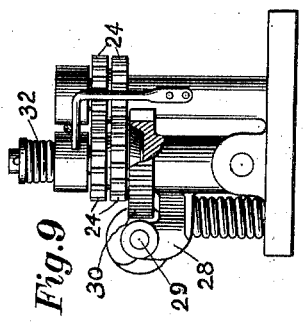
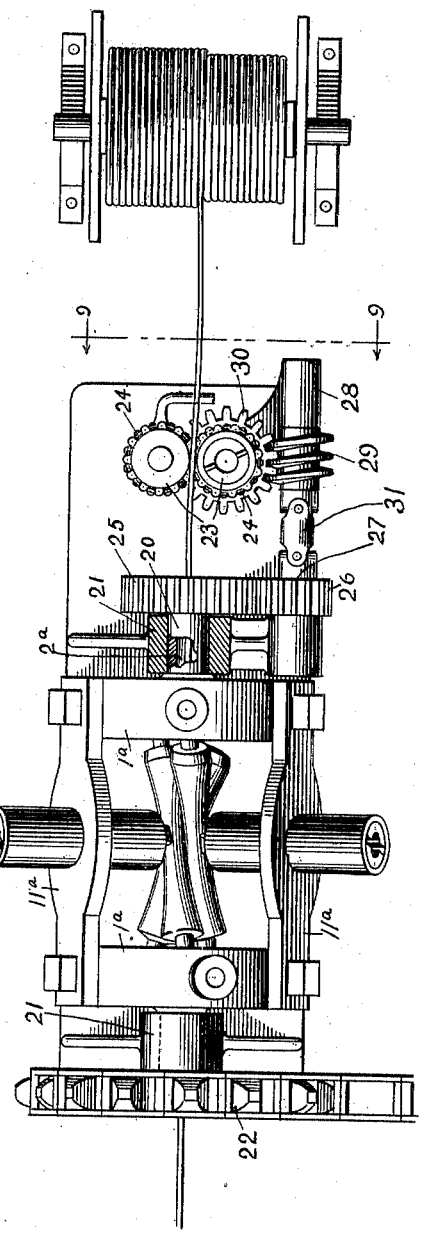
WITNESSES:
M. Gertrude Ady.
Fred. G. Fischer.
INVENTOR
John A. Gregersen
BY
Burton & Burton
his ATTORNEYS No. 760,406. Patented May 17, 1904.

UNITED STATES PATENT OFFICE.

JOHN A. GREGERSEN, OF CHICAGO, ILLINOIS, ASSIGNOR OF ONE-HALF TO F. J. KUHLMAN, OF CHICAGO, ILLINOIS.

WIRE-STRAIGHTENER.

SPECIFICATION forming part of Letters Patent No. 760,406, dated May 17, 1904.

Application filed February 21, 1903. Serial No. 144,451. (No model.)

*To all whom it may concern:*

Be it known that I, JOHN A. GREGERSEN, a citizen of the United States, residing at No. 2277 Milwaukee avenue, in the city of Chicago, in the county of Cook and State of Illinois, have invented new and useful Improvements in Wire-Straighteners, of which the following is a specification, reference being had to the accompanying drawings, forming a part thereof.

The purpose of this invention is to provide improved mechanism for straightening wire.

It consists of the features of construction set out in the claims.

In the drawings, Figure 1 is a front elevation of my improved wire-straightener in a form adapted for operating upon detached pieces of wire. Fig. 2 is a horizontal section at the line 2 2 on Fig. 1 upon an enlarged scale. Fig. 3 is a detail section at the line 3 3 on Fig. 1 on a similar enlarged scale. Fig. 4 is a top plan partly-sectional section, being made at the line 4 4 on Fig. 1. Fig. 5 is a section at the line 5 5 on Fig. 1. Fig. 6 is a plan view of one of the straightening-rolls with its spherical journal-bearings. Fig. 7 is a vertical section at the line 7 7 on Fig. 1. Fig. 8 is a plan view of a modified form of my invention adapted for straightening wire in continuous length, as when taken from a reel. Fig. 9 is a section at the line 9 9 on Fig. 8. Fig. 10 is a detail plan view of the head-plate at the entering end of the machine shown in Figs. 1 to 7, inclusive, illustrating a means of adjusting the spread of the straightening-rolls.

I will describe first the form of my invention adapted for operating on detached pieces of wire. The principal use with respect to which I have devised this form is the straightening of core-wires in metal foundries, and I have constructed it in detail with a view to ordinary sizes and lengths of such wires, although the length of the wire would make no difference in the structure provided the wire is not too long to be allowed to rotate as it passes through the machine. In this form I provide two fixed cheeks or bearing-plates 1 1, having apertures 2 2 in line. In each of these cheeks or bearing-plates there are three bearings 3 3 3, arranged to move radially toward the axis of the apertures 2 2, provided with springs 4 4 4 for forcing them inward toward the center and adjusting-screws 5 5 5 for regulating the tension of said springs. In these bearings there are journaled three straightening-rolls 6 6 6 of peculiar construction. Each roll extends obliquely with respect to the axis of the apertures 2 2, and the three rolls are so shaped that their surfaces are in contact throughout their entire length, except as hereinafter specified, the interval or aperture between them, as seen at 7 in the transverse sectional views, being coaxial with the apertures 2 2. This gives to the rolls a double conical form, but with outlines concavely curved in axial section, as seen in Figs. 1 and 6. At the center of the length of the rolls they are each held and pressed inward toward the axis of the group by the plungers 8 8, provided with antifriction-rolls 9 at their inner ends to bear upon the straightening-rolls, such plungers being mounted in radial bearings 10 10 10, supported on the cross-bars 11 11 11, which connect the heads 1 1. Springs 12 12 12 are lodged behind the plungers in their respective bearings, and adjusting-screws 13 13 13 behind the springs serve to regulate the pressure of the plungers upon the straightening-rolls. The plungers are feathered in their bearings, as by having the roll-pintles $8^a$ protrude into the slots $10^a$ in the bearings, to prevent them from rotating about their axes, so that they may hold the antifriction-rolls properly against the surface of the straightening-rolls, respectively, in position to be revolved by the latter. It may be understood that if the straightening-rolls 6 6 6 are revolved about their respective axes, with their curved surfaces in contact, a rod or wire which may be introduced between them through the aperture 2 in either head-plate will be drawn in between the rolls revolving in proper direction by virtue of the oblique relation of the rolls to the axis of the interval between them in which the wire is entered—that is, each roll will operate as with a screw feeding movement by virtue of its frictional engagement of the periphery of the rod or wire and will thus tend to thrust the latter longitudinally in one direction or the other, according to the direction of rotation. It will also be noticed that the axial aperture 7 is smallest at the middle point of the length of the rolls, where they themselves have their least diameter, and that a wire of suitable size to be entered at the end of the axial aperture, and which is thereby exposed to the feeding grasp of the rolls, will as it is drawn in through said aperture cause the rolls to be forced outward sufficiently to accommodate the wire at the middle point of the length of the rolls, and the wire being rotated about its own axis while thus longitudinally fed through a space which accommodates it only by virtue of the rolls yielding back against the pressure of the springs acting both upon the bearings of the rolls at the ends and upon the rolls themselves directly at the middle will be perfectly straightened. For the purpose of communicating rotary motion to the rolls I connect them at one end by universal joint, as seen at 14 14 14, with parallel shafts 15 15 15, which are journaled in a third head or bearing plate 16, at the center of which—that is, with its axis in line with the aperture 2 between the straightening-rolls—there is journaled a master-gear 17, axially apertured to permit the wire to pass through and engaging and driving at its periphery gears 18 18 18 of the shafts 16 16 16, respectively. Any convenient means may be employed to rotate the master-gear. I have shown it rigid with the sprocket-wheel 19 for this purpose.

For the purpose of straightening wire in continuous length, as when taken from a reel, it will be evident that the wire must not be rotated about its own axis, and the necessary transposition of the action requires that the system of straightening-rolls should rotate about the axis of the wire, and for this purpose, therefore, the cheeks 1ª 1ª, (see Fig. 8,) connected together with bars 11ª, are provided with trunnions 20 20 at the center at their outer sides, respectively, and by these trunnions they are journaled in fixed bearings 21 21, the apertures 2ª extending through the trunnions at the center to admit the wire. One of the heads 1ª has rigid with it a sprocket-wheel 22, by which power may be applied to rotate the entire flier in the bearings. The action of this structure upon the wire would be the same, so far as the tendency to feed it through and straighten it, so long as the wire itself is prevented from rotating, and for that purpose, as well as to check the torsional effect which the group of rolls rotating about it would have, and which would in the absence of any preventing means tend to twist it for a distance back onto the reel, it is well to provide at a point conveniently near the entrance to the rotating flier a pair of feed-rolls 23 23, strongly pressed together to grasp the wire and prevent any torsion extending back of the point at which it is thus grasped. Preferably, also, such rolls may be rotated to feed the wire longitudinally. For this purpose it is necessary to provide means for rotating the rolls in which at some point there should be a connection sufficiently yielding to prevent the wire from being fed any faster than the maximum rate at which it might theoretically be advanced by the screw feeding action of the straightening-rolls operating by friction on the wire in planes of rotation oblique to the axis of the latter, as above described. For the purpose of thus driving the feed-rolls 23 23 I have shown them provided with intermeshing gears 24 24, having teeth of sufficient depth of mesh to permit the rolls to spread and close up the amount necessary to cover the difference in diameter between the minimum and maximum sizes of wire for which the particular machine may be adapted. This range will not usually be more than from one-sixteenth of an inch to three-sixteenths of an inch. Rigid with the trunnion 20 at the entering end of the machine I provide a gear 25, which meshes with the pinion 26 on a shaft 27, journaled in the standard 21. On the bracket 28, in which the feed-rolls are journaled, there is also journaled a worm-shaft 29, which meshes with a worm-wheel 30 on the same shaft with one of said feed-rolls and is held in strong frictional engagement with the latter by a spring 32. Said worm-shaft is connected with the shaft 27 of the pinion 26 by a flexible coupling 31, such flexibility being conveniently effected by universal joints connecting such couplings with the two shafts, as illustrated.

In order to facilitate the entrance of wire into the axial aperture between the three straightening-rolls, it may be found desirable to taperingly reduce the ends of the rolls at the entrance end of the group, so as to give a slightly flaring mouth to the axial aperture through the group. Such slight reduction at the end of the roll is seen in plan view of a single roll, Fig. 6.

In order to prevent the straightening-rolls from revolving in frictional contact with each other when there is no wire passing through them and also to hold them sufficiently spread apart to readily admit wire according to the size of the latter, I permit them to approach sufficiently to grasp the wire. I provide for limiting the approach of the rolls to each other under the pressure of the springs, which tend thus to force them together, by a device which is shown in Fig. 10, consisting of a cam-plate 35, which is mounted upon an annular boss or bearing 36 on the head-plate at the receiving end, (see Fig. 7,) said cam-plate having three eccentric rings 37 37 37 in position to operate, respectively, against the journals of the three straightening-rolls which protrude through the plate at that end, so that by rocking the plate in one direction about its bearing and about the axis of the system of rolls the rolls are forced apart at that end, and by rocking it in the other direction they are allowed to approach. A handle 38 is provided for thus operating the cam-plate, and this handle has a segmental slotted cross-arm 39, through which protrudes a stud-screw 40, rooted in the face of the head-plate and provided with a lock-nut 41 for securing the cam-plate in position to which it may be adjusted. I have shown such cam-plate at one end only; but it is evident that the use of such cam-plate is not limited to one end, though sufficient range of adjustment being provided its use at one end serves the purpose of separating the rolls to permit the easy entrance of the wire.

I claim—

1. In a wire-straightener, as a means for operating directly upon the wire for straightening it, a group of three longitudinally concave rolls journaled obliquely to each other and to the axis of the group, and means for holding them yieldingly inward toward such axis, their concave curvature in axial section being such with relation to their obliquity to said axis that they are adapted to be successively in contact throughout their entire operative length, and means for causing them to rotate all in the same direction about their respective axes when the wire to be straightened is introduced between them.

2. A wire-straightener comprising a group of three longitudinally concave rolls; head-plates in which the rolls are journaled obliquely to each other and to the axis of the group; bearings for said rolls in said head-plates being movable radially with respect to the axis of the group; springs mounted in the head-plates holding said bearings yieldingly inward toward such axis, and means for producing relative rotation of the group and of a rod or wire introduced into the aperture between the rolls about the axis of the group.

3. A wire-straightener comprising a group of three longitudinally concave rolls journaled obliquely to each other and to the axis of the group; head-plates at the opposite ends of the groups and bearings in said plates for the rolls respectively, said bearings being movable radially with respect to the axis of the group; plungers mounted so as to press radially upon the rolls respectively at the middle of their length, and springs operating upon the plungers to exert such pressure yieldingly.

4. A wire-straightener comprising a group of three longitudinally concave rolls journaled obliquely to each other and to the axis of the group, their concave longitudinal curvature being such with relation to their obliquity that they are adapted to be in contact each with the other two substantially throughout the entire length, and means for holding them each yieldingly pressed inward toward the axis of the group throughout their entire length and for rotating them about their respective axes.

5. A wire-straightener comprising a group of three longitudinally concave rolls journaled obliquely to each other and to the axis of the group, their longitudinal concavity being such, relative to their obliquity, that they are adapted to be in contact each with the other two throughout substantially their entire concave length, said rolls being at one end reduced in diameter for a short distance to enlarge the mouth of the aperture formed between them about the axis of the group, and means for holding such rolls yieldingly pressed inward toward such axis.

6. A wire-straightener comprising a group of three longitudinally concave rolls journaled obliquely to each other and to the axis of the group, having their points of least diameter all substantially in the same plane transverse to the axis of the group, whereby they are adapted to grasp a rod or wire directly between them at such point; means for holding them all yieldingly inward toward such axis at such point to thus grasp the rod or wire, and means for rotating them about their respective axes.

7. A wire-straightener comprising a group of three longitudinally concave rolls; head-plates in which the rolls are journaled obliquely to each other and to the axis of the group, the bearings for said rolls in said head-plates being movable radially with respect to the axis of the group; springs mounted in the head-plates holding said bearings yieldingly inward toward said axis, and means for rotating the rolls respectively.

8. A wire-straightener comprising a group of three longitudinally concave rolls journaled obliquely to each other and to the axis of the group; means holding the bearings of the rolls yieldingly inward toward such axis; a bearing-plate or standard at a distance from one end of the rolls; three wheels journaled on such standard, and means for rotating them, and shafts extending from said wheels respectively to the rolls having universal-joint connections at their opposite ends with said wheels and rolls respectively.

9. A wire-straightener comprising a group of three longitudinally concave rolls journaled obliquely to each other and to the axis of the group; head-plates at the opposite ends of the group, and bearings in said plates for the rolls respectively, movable radially with respect to the axis of the group; springs operating on said bearings to hold them yieldingly inward toward the axis; screws for adjusting the tension of the springs, and means for rotating the rolls about their respective axes.

10. A wire-straightener comprising a group of three longitudinally concave rolls journaled obliquely to each other and to the axis of the group; means for rotating the rolls about their respective axes; plungers mounted so as to press radially upon the rolls respectively at the middle of their length; springs operating on the plungers to exert such pressure, and screws for adjusting the tension of the springs.

11. A wire-straightener comprising a group of three longitudinally concave rolls journaled obliquely to each other and to the axis of the group; head-plates having bearings for the rolls respectively movable radially with respect to said axis; means for yieldingly pressing the bearings inward toward the axis; plungers operating upon the rolls respectively at the middle point of their length, and bearings in which they are mounted and guided radially with respect to the axis of the group to press the rolls together, and springs operating upon the plungers to produce such pressure.

12. A wire-straightener comprising a group of three longitudinally concave rolls journaled obliquely to each other and to the axis of the group; head-plates in which such rolls are journaled, having bearings for the rolls movable radially with respect to said axis, and means for holding them yieldingly inward toward the axis, said head-plates being apertured axially with respect to the group of rolls, to admit the wire through the latter; a standard at a distance from one end of the group; three wheels mounted on such standard, and a master-wheel at the center meshing with said three wheels; shafts extending from said wheels to the rolls respectively, having universal-joint connections with the wheels and rolls, the master-wheel being axially apertured in line with the axis of the group of rolls.

13. A wire-straightener comprising a group of three longitudinally concave rolls; head-plates in which the rolls are journaled obliquely to each other and to the axis of the group; bearings for said rolls and said head-plates being movable radially with respect to the axis of the group; springs mounted on the head-plates holding said bearings yieldingly inward toward the axis, and an annular plate mounted on one of the head-plates about said axis, having eccentric cams for acting against the shafts of the three rolls respectively to limit their inward movement and adjustable about the axis to vary such limit.

In testimony whereof I have hereunto set my hand, in the presence of two witnesses, at Chicago, Illinois, this 14th day of February, A. D. 1903.

JOHN A. GREGERSEN.

In presence of—
    J. S. ABBOTT,
    FREDK. G. FISCHER.